(12) United States Patent
Pahl (10) Patent No.: US 8,444,088 B2
(45) Date of Patent: May 21, 2013

(54) FUSELAGE STRUCTURE AND METHOD FOR THE PRODUCTION OF A FUSELAGE STRUCTURE

(75) Inventor: Guenter Pahl, Hamburg (DE)

(73) Assignee: AIRBUS Operations GmbH, Hamburg (DE)

( * ) Notice: Subject to any disclaimer, the term of this patent is extended or adjusted under 35 U.S.C. 154(b) by 637 days.

(21) Appl. No.: 12/227,909

(22) PCT Filed: May 31, 2007

(86) PCT No.: PCT/EP2007/055286
§ 371 (c)(1),
(2), (4) Date: Mar. 5, 2009

(87) PCT Pub. No.: WO2007/141176
PCT Pub. Date: Dec. 13, 2007

(65) Prior Publication Data
US 2009/0166471 A1    Jul. 2, 2009

Related U.S. Application Data

(60) Provisional application No. 60/810,247, filed on Jun. 2, 2006.

(30) Foreign Application Priority Data

Jun. 2, 2006 (DE) .......................... 10 2006 025 930

(51) Int. Cl.
*B64C 1/00* (2006.01)
(52) U.S. Cl.
USPC ...................... 244/119; 244/129.3; 244/120

(58) Field of Classification Search
USPC ..... 52/204.61, 456, 786.11, 786.12; 244/119, 244/129.1, 129.3, 158.1
See application file for complete search history.

(56) References Cited

U.S. PATENT DOCUMENTS

| | | | |
|---|---|---|---|
| 1,441,984 A * | 1/1923 | Jacobs | 244/119 |
| 2,203,174 A | 6/1940 | Muttray et al. | |
| 2,327,636 A | 8/1943 | Gerber | |
| 2,613,402 A | 10/1952 | Gouge | |
| 2,659,686 A | 11/1953 | Watkins | |
| 3,429,530 A * | 2/1969 | Heinrich | 244/129.3 |
| 4,035,536 A * | 7/1977 | Morrison | 428/118 |
| 4,450,661 A | 5/1984 | Whitener | |
| 6,736,352 B2 | 5/2004 | Bladt et al. | |
| 7,802,413 B2 * | 9/2010 | Wood et al. | 52/656.5 |
| 2001/0004096 A1* | 6/2001 | Entelmann et al. | 244/119 |
| 2003/0080251 A1* | 5/2003 | Anast | 244/119 |
| 2005/0053765 A1 | 3/2005 | Albers et al. | |
| 2006/0060705 A1 | 3/2006 | Stulc et al. | |

(Continued)

FOREIGN PATENT DOCUMENTS
EP    1 063 166    12/2000
EP    1 642 824 A2    4/2006

(Continued)

*Primary Examiner* — Christopher P Ellis
*Assistant Examiner* — Medhat Badawi
(74) *Attorney, Agent, or Firm* — Maginot, Moore & Beck (57) ABSTRACT

The present invention provides a method for the production of a fuselage structure, and a fuselage structure, in particular of an aircraft or spacecraft, with an inner shell arrangement which has an upper inner shell and a lower inner shell, the upper inner shell being spaced apart at least in some sections from the lower inner shell by a first gap in order to form a window region; and a window band which is arranged at least in the window region and has a pane device which comprises a grid structure which absorbs fuselage forces.

8 Claims, 5 Drawing Sheets

U.S. PATENT DOCUMENTS

| | | | |
|---|---|---|---|
| 2006/0071125 A1* | 4/2006 | Wood et al. | 244/119 |
| 2007/0069079 A1* | 3/2007 | Rassaian et al. | 244/129.3 |
| 2009/0026318 A1* | 1/2009 | Gross et al. | 244/131 |
| 2010/0126101 A1* | 5/2010 | Wood et al. | 52/650.3 |
| 2010/0200697 A1* | 8/2010 | Sankrithi et al. | 244/119 |
| 2010/0320324 A1* | 12/2010 | Dittmar et al. | 244/129.3 |
| 2011/0017870 A1* | 1/2011 | Gallant et al. | 244/129.3 |
| 2011/0024564 A1* | 2/2011 | Wood et al. | 244/129.3 |

FOREIGN PATENT DOCUMENTS

| | | |
|---|---|---|
| FR | 1497214 | 10/1967 |
| GB | 620863 | 3/1949 |
| RU | 2197410 C2 | 1/2003 |
| SU | 1663894 A1 | 9/1995 |
| WO | 0020275 | 4/2000 |
| WO | 2007141176 A1 | 12/2007 |

* cited by examiner

FUSELAGE STRUCTURE AND METHOD FOR THE PRODUCTION OF A FUSELAGE STRUCTURE

FIELD OF THE INVENTION

The present invention relates to a fuselage structure and to a method for the production of a fuselage structure, in particular of an aircraft or spacecraft.

BACKGROUND OF THE INVENTION

Aircraft fuselages nowadays are generally manufactured in an aluminium shell construction. For the arrangement of windows, window openings are milled into the shells, which are assembled in a later manufacturing step to form a section of the aircraft fuselage. The shells can be either of single-walled or double-walled or multi-walled design with inner and outer shells being used, and with sandwich core material arranged between the inner and outer shells. The arrangement of the window openings in the shells is generally selected in such a manner that, in the finished aircraft fuselage, they are located approximately at eye level of people sitting in the passenger compartment. When looking at an aircraft fuselage from the outside, the window openings are arranged along one or more window bands running laterally along the aircraft fuselage.

After the window openings have been milled, they are each reinforced by an aluminium window frame. The window panes are subsequently placed into the aluminium window frames.

The fact that the windows constitute a mechanical weakening of the aircraft fuselage structure has proven a drawback to the above method for the arrangement of windows in an aircraft fuselage. This weakening is compensated for, as is known, by solid aluminium window frames. These disadvantageously result in an increased structural weight, high production costs due to the arrangement of the aluminium window frames in a separate working step, which is particularly labour-intensive because of rivets, and in further disadvantages, such as, for example, that only relatively small windows can be made.

SUMMARY OF THE INVENTION

It is therefore the object of the present invention to provide a fuselage structure and a method for the production of a fuselage structure, which ensure a light region without the use of solid window frames.

According to the invention a fuselage structure with the features of patent claim 1 and a method with the features of patent claim 10 is provided.

The idea on which the present invention is based is that the fuselage structure, in particular of an aircraft or spacecraft, has an inner shell arrangement, which has a lower inner shell and an upper inner shell, the upper inner shell being spaced apart at least in some sections from the lower inner shell by a first gap in order to form a window region; and a window band which is arranged at least in the region of the first gap and has a pane device which comprises a grid structure which absorbs fuselage forces.

The present invention therefore has the advantage over the approaches mentioned at the beginning that the grid structure takes over the function of the window frames used in a conventional construction. Consequently, the fuselage structure is strengthened in the region of the window band, and the fuselage forces which occur are deflected around the recessed window regions in the region of the window band. A structure which is optimized in terms of force flux in such a manner enables the windows to advantageously turn out to be considerably larger than has generally hitherto been possible.

Advantageous refinements and improvements of the fuselage structure provided in patent claim 1 and of the method provided in patent claim 10 are found in the sub claims.

According to a preferred development, the fuselage structure furthermore has an outer shell arrangement which has a lower outer shell associated with the lower inner shell and an upper outer shell associated with the upper inner shell, the upper outer shell being spaced apart at least in some sections in the window region from the lower outer shell by a second gap. This ensures a double shell arrangement which is optimized in terms of force flux and has a grid structure which conducts the forces around the window region and is particularly advantageous in today's double shell construction for aircraft.

According to a further preferred development, the grid structure has individual grid ribs for forming grid meshes, the grid structure being designed to absorb the forces occurring in the fuselage. The grid structure is advantageously designed as a lattice grid structure or the like and, in terms of shape configuration, is matched to the shape of the shell arrangement. The curvature of the grid structure is advantageously matched to the curvature of the respective shells. In addition, a lattice grid structure can better transmit forces than other grids, such as, for example, an ISO grid structure.

According to a further preferred exemplary embodiment, the grid structure extends beyond the window region, which is formed by the first and second gaps, into the shell arrangements and can be fastened to the individual shells of the shell arrangements in order to form a fuselage structure which connects the individual shells to one another and is optimized in terms of force flux. This can be brought about, for example, by means of a suitable adhesive bonding connection or the like. This ensures an optimized transmission of force from the fuselage structure to the lattice structure, even in the region of the window band.

The first gap and the second gap are advantageously formed at the same height and, at least in some sections, such that they run in the longitudinal direction of the fuselage structure, in order to form an optimized window region. This ensures an optimum region of view for the occupants, with it being possible for the window region to be configured to be an adequate size on account of the grid structure which absorbs the fuselage forces. In addition, the first gap and the second gap have, in particular, the same gap width and/or gap lengths, and they are therefore matched to each other in such a manner that an optimum region of view for the occupants is ensured.

According to a further preferred refinement, the double pane has at least two individual panes which each end flush with the inner and/or outer shells, can be fastened to the inner and/or outer shells and enclose the grid structure between them. This results in a robust window band structure which deflects the fuselage forces over the window region and permits an optimum view for the occupants out of the vehicle.

According to a further preferred exemplary embodiment, a suitable core material is provided between the inner and outer shells, at least with the exception of the window region. Said core material can be fastened to the inner and/or outer shells, for example, likewise by means of a suitable adhesive bonding process or the like.

It is obvious to a person skilled in the art that one or more of the above-described window regions can be provided in different regions in, for example, an aircraft, with it being possible for the fuselage structure in this case also to be formed from a plurality of shell sections in the longitudinal direction, for example, or from shells with suitable recesses in the respective window regions.

If a plurality of window bands extend on one side along the aircraft fuselage, the method according to the invention and the fuselage structure according to the invention are used correspondingly for each window band, with, for example, in the case of two window bands, three inner shells, in particular an upper inner shell, a central inner shell and a lower inner shell, being arranged, each spaced apart from one another by the height of the particular window band, and subsequently use being made of a grid-shaped connecting structure which overlaps both window bands, or of two grid-shaped connecting structures, which each overlap a window band, in order to connect the inner shells, which are spaced apart from one another, to one another. After the arrangement of the sandwich core material, three outer shells, in particular an upper outer shell, a central outer shell and a lower outer shell, are arranged on the inner shells, each spaced apart from one another on the sandwich core material and the grid-shaped connecting structure by the height of the respective window band before the window panes are arranged on the inside and outside in the region of the window bands.

The method according to the invention is preferably used in a double-shell fuselage construction. In this case, the main elements of the aircraft fuselage structure, i.e. the lower shell and the upper shell, are designed as a double shell in each case comprising an inner and an outer shell, and the window band is designed as a double pane reinforced by means of the grid-shaped connecting structure. However, it is also conceivable to use the basic idea of the present invention in fuselages of single-shell construction. In this case, the connecting structure is then preferably arranged from the inside on the shells which are spaced apart from one another, and therefore the connecting structure spans the gap formed and connects the two shells to each other. Window panes which preferably close the gap and end flush with the shells are then arranged on the connecting structure from the outside. On the inside, window panes can likewise additionally be arranged on the connecting structure. Furthermore, coverings, insulation materials and the like can also be arranged on the inside of the outer shells.

The grid-shaped connecting structure takes on the function of the window frames used in a conventional construction. The function is a strengthening of the fuselage structure in the region of the window band and a deflection of the force flux around the windows in the region of the window band.

The present invention has the advantage over the prior art that the grid-shaped connecting structure can be designed with regard to the force flux, and therefore the grid ribs forming the grid-shaped connecting structure run in the direction of the forces which occur in the aircraft fuselage. As a result, the forces which occur are conducted around the windows. The grid ribs can comprise either fibre structures, such as, for example, carbon fibres, aramid fibres, glass fibres and the like, or fibre-reinforced structures, such as, for example, fibre-reinforced plastics, fibre-reinforced composite structures, such as, for example, fibre-reinforced metals and fibre-reinforced metal sandwich structures, and metallic structures, such as, for example, metallic struts, bands and the like.

A further advantage is that the structure which is optimized in terms of force flux enables the windows to turn out to be considerably larger than in a conventional construction. Furthermore, unlike in the conventional construction, the complicated installation of the individual windows and their frames is omitted.

A particularly advantageous refinement of the invention makes provision for the grid-shaped connecting structure to comprise a lattice grid. A lattice grid, which is also referred to as an anisogrid structure, is distinguished in that the meshes formed by the grid ribs do not have the same geometrical shapes and dimensions in all of the regions of the lattice grid. Typically, in a lattice grid, the grid ribs are oriented primarily with regard to the forces which occur and not with regard to a geometrical structure which can be produced as simply as possible. This may result in irregular geometries of the meshes, at least in parts of the lattice grid, with it also being possible that, in other parts of the lattice grid, regular structures similar to an ISO grid structure occur. Lattice grids are therefore more suitable than other grid-shaped structures, such as, for example, ISO grid structures, to transmit forces. Furthermore, lattice grids can be composed of a plurality of different materials which can be selected in accordance with the forces which occur, the dynamic force profile and the expansions required in certain directions.

An additional advantageous refinement of the invention makes provision for the thickness of the grid-shaped connecting structure and the thickness of the sandwich core material to be essentially identical.

BRIEF DESCRIPTION OF DRAWINGS

The invention is explained in more detail below using exemplary embodiments with reference to the attached figures of the drawing, in which:

FIG. 3a shows a schematic front view of an inner shell arrangement according to a preferred exemplary embodiment of the present invention;

FIG. 3b shows a schematic cross-sectional view of the inner shell arrangement from FIG. 3a;

FIG. 4b shows a schematic cross-sectional view of the arrangement from FIG. 4a;

FIG. 5a shows a schematic front view of a fuselage structure, comprising an inner and outer shell arrangement with a grid structure according to a preferred exemplary embodiment of the present invention arranged in between;

FIG. 5b shows a schematic cross-sectional view of the arrangement from FIG. 5a;

FIG. 6b shows a schematic cross-sectional view of the fuselage structure from FIG. 6a;

In the figures, the same reference numbers refer to identical or functionally identical components, unless stated otherwise.

DETAILED DESCRIPTION OF THE INVENTION

A method for the production of an aircraft fuselage structure in a shell construction with a window band running along the aircraft fuselage structure takes place, according to a preferred exemplary embodiment of the present invention with reference to FIG. 1, as follows:

In a first method step I, a grid-shaped connecting structure which is optimized with regard to the force flux in the finished aircraft fuselage structure is premanufactured. The length of the grid-shaped connecting structure corresponds approximately to the length of a fuselage section to be produced or to the length of a window region to be provided. The width of the grid-shaped connecting structure is preferably greater than the desired height of the window band. The meshes of the grid-shaped connecting structure, which are formed by the grid ribs, are approximately the size of the individual windows of the window band, at least in the region in which, in a later method step, window panes are arranged on the grid-shaped connecting structure.

The grid-shaped connecting structure is optimized with regard to the force flux, for example, in such a manner that a numerical simulation, for example a finite-element analysis (FEM), is used to calculate the force flux at least with regard to the magnitude and the direction of the forces occurring in the region of the window band. A grid structure is then prepared, which coincides as precisely as possible with the calculated directions of the forces which occur, and has meshes of an adequate size in the region of the window band in order to be able to use said meshes as windows.

In a further step, the forces which occur in the prepared grid structure are calculated and the grid ribs which form the grid-shaped connecting structure are dimensioned with regard to dimensions, such as, for example, cross sections and the like, and with regard to the materials to be used. The grid-shaped connecting structure is premanufactured on the basis of these sizes.

In a second method step II, two inner shells, an upper inner shell and a lower inner shell, are arranged at a distance corresponding to the height of the window band.

In a third method step III, the inner shells are connected to one another by means of the premanufactured grid-shaped connecting structure. This takes place in such a manner that the grid-shaped connecting structure is connected to the inner shells, for example by adhesive bonding, in a manner overlapping the gap between the inner shells, which corresponds in its width to the height of the window band. The grid-shaped connecting structure spans the gap between the inner shells, with the meshes of the grid-shaped connecting structure, which are to serve as windows, coming to lie precisely in the region of the gap.

In a fourth method step IV, a sandwich core material is arranged from the outside on those regions of the inner shells which are not covered by the grid-shaped connecting structure. The sandwich core material and the grid-shaped connecting structure preferably have the same thickness perpendicular to the local surface of the inner shells.

In a fifth method step V, two outer shells, an upper outer shell and a lower outer shell, are arranged on the core material and the overlapping part of the grid-shaped connecting structure at a distance corresponding to the height of the window band in such a manner that the outer shells are spaced apart from one another in the region of the window band and the later window band is covered neither by the inner shells nor by the outer shells.

In a sixth method step VI, to complete the window band, according to the present exemplary embodiment, window panes are arranged on both sides of that region of the grid-shaped connecting structure which is not covered by the inner and outer shells. The window panes end flush with the inner and outer shells both with regard to the dimensions of the window band and with regard to the thickness of the inner and outer shells.

The method steps described above and illustrated in FIG. 1 are explained in more detail below with reference to FIGS. 2 to 6.

Figure 1:
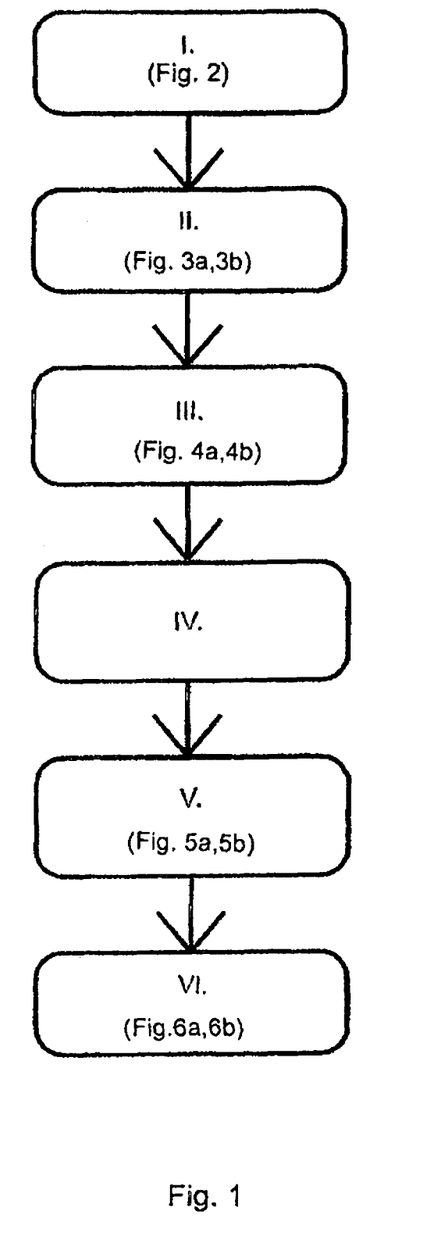
FIG. 1 shows a flow diagram of a method for the production of a fuselage structure according to a preferred exemplary embodiment of the present invention.
Figure 2:
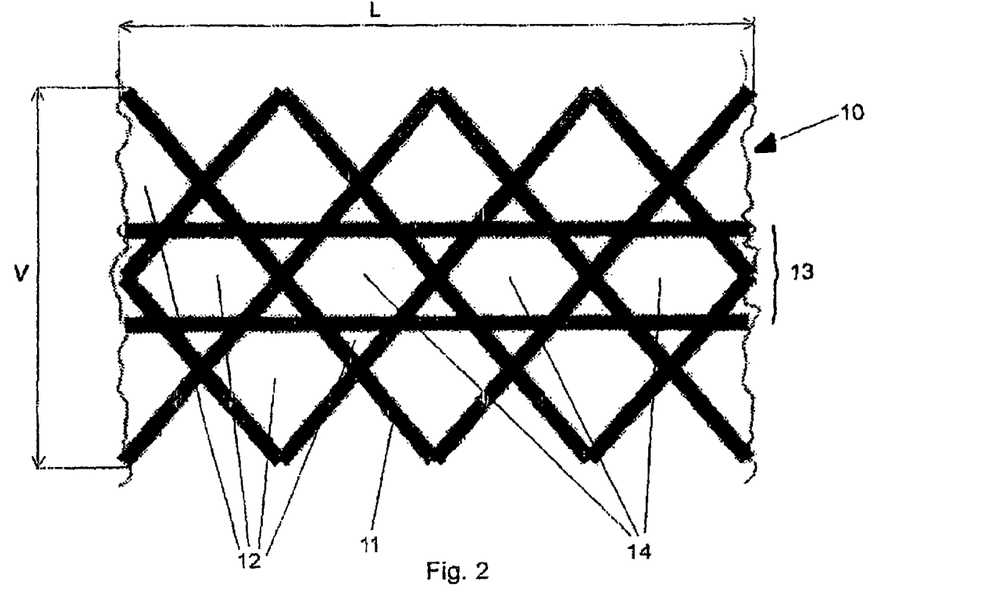
FIG. 2 shows a schematic illustration of a grid structure according to a preferred exemplary embodiment of the present invention.
Figure 6A:
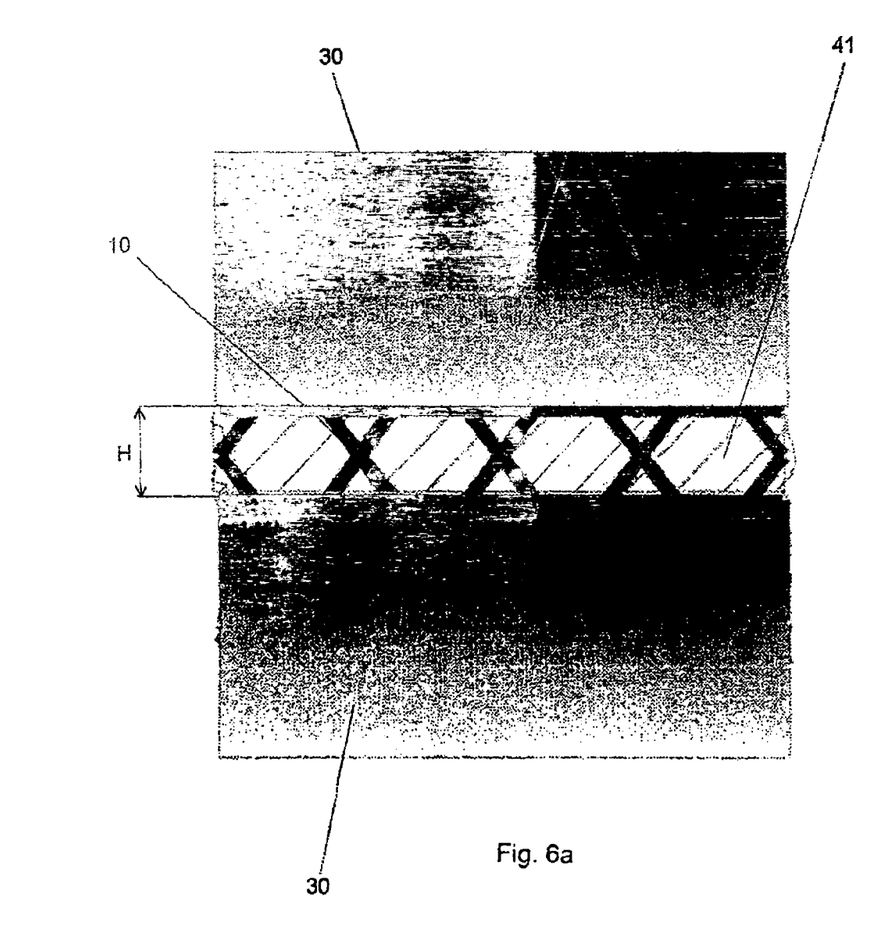
FIG. 6a shows a schematic front view of a completed fuselage structure according to a preferred exemplary embodiment of the present invention.

FIG. 2 illustrates, by way of example, a grid-shaped connecting structure 10 which is premanufactured in a first method step I (FIG. 1) in a lattice construction. The grid-shaped connecting structure 10 comprises, in particular, grid ribs 11 and meshes 12 formed by the grid ribs 11. The grid-shaped connecting structure 10 is optimized, with regard to magnitude and direction of the forces which occur, to the force flux occurring in the region of the window band 41 of the aircraft fuselage structure (FIG. 6a). For this purpose, the grid ribs 11 of the grid-shaped connecting structure 10 are preferably oriented in the direction of the forces to be anticipated. The meshes 12 of the grid-shaped connecting structure 10 are dimensioned, at least in the region 13 which comes to lie in the region of the window band, in such a manner that each mesh 14 serves as a window. The length L of the grid-shaped connecting structure 10 corresponds to the length S of a fuselage section to be produced. The width V of the grid-shaped connecting structure 10 is greater than the height H of the window band 41 (FIG. 6).

Figures 3A, 3B:
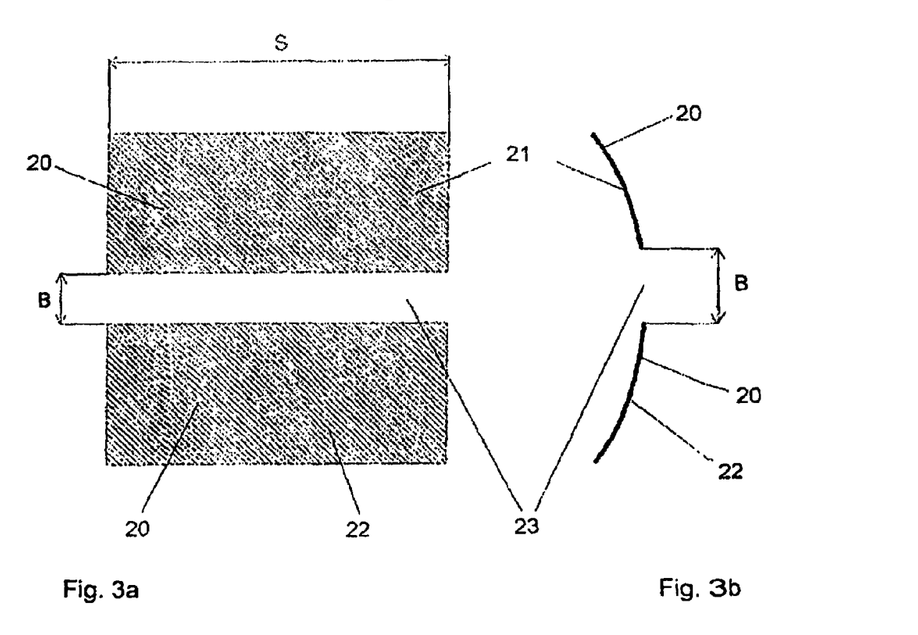

In FIGS. 3a and 3b, it is apparent how, in accordance with the second method step II (FIG. 1), an upper inner shell 21 and a lower inner shell 22 are arranged at a distance with respect to each other that corresponds to the desired height of the window band. The two inner shells 20 here are positioned on an apparatus in such a manner that a gap 23, the width B of which corresponds to the height H of the window band 41 (FIG. 6), remains free. The meshes 14 which serve as viewing regions come to lie in the region of the gap 23.

Figure 4A:
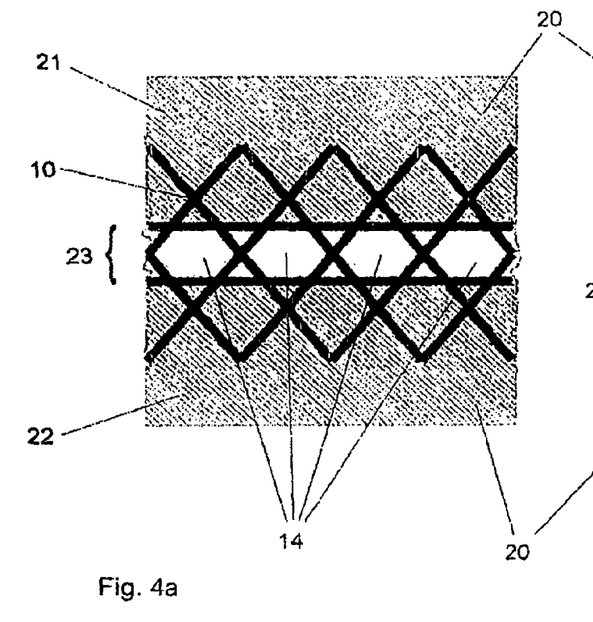
FIG. 4a shows a schematic illustration of the inner shell arrangement from FIGS. 3a and 3b with the fitted grid structure according to a preferred exemplary embodiment of the present invention.
Figure 4B:
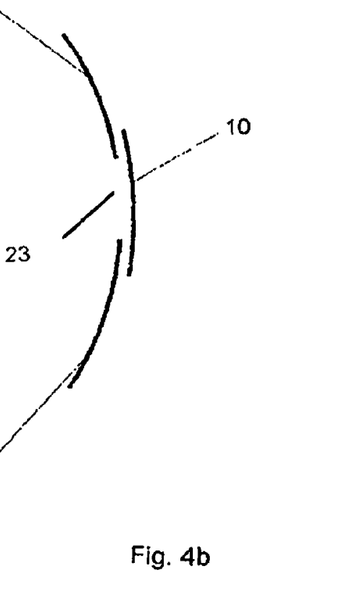

FIGS. 4a and 4b illustrate a means of fixing, by way of example, the grid-shaped connecting structure 10 on the inner shells 20 in accordance with the method step III (FIG. 1). The grid-shaped connecting structure 10 overlaps the gap 23 between the inner shells 20. In the process, the grid-shaped connecting structure 10 overlaps the upper inner shell 21 and the lower inner shell 22.

The fourth method step IV (FIG. 1), in which sandwich core material is arranged from the inside to the outside on those regions of the inner shells which are not covered by the grid-shaped connecting structure takes place in accordance with known procedures and is not illustrated in a separate figure.

Figure 5A:
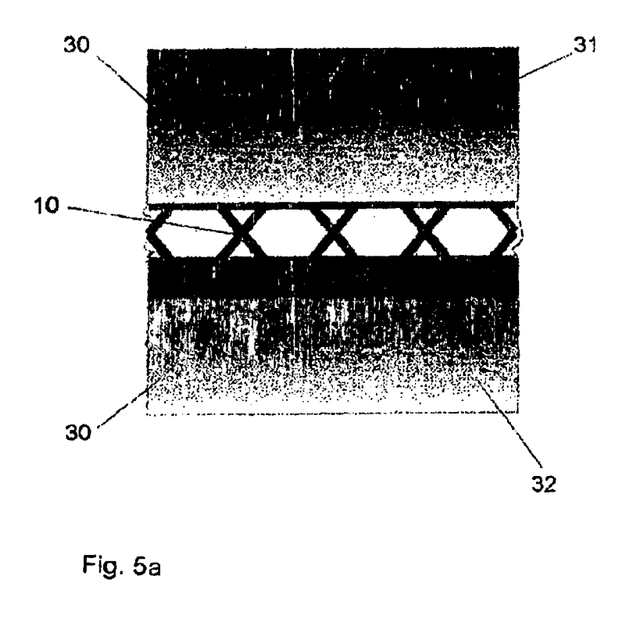
Figure 5B:
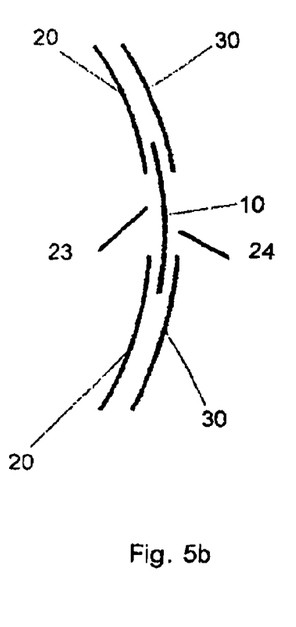

It can be seen from FIGS. 5a and 5b how, in accordance with method step V (FIG. 1), two outer shells 30, an upper outer shell 31 and a lower outer shell 32, are arranged on the core material (not illustrated) and the grid-shaped connecting structure 10 at a distance corresponding to the height H of the window band 41 (FIG. 6) in order to form a second gap 24. The outer shells 30 are preferably arranged like the inner shells 20 at a distance from one another in the region of the window band 41.

Figure 6B:
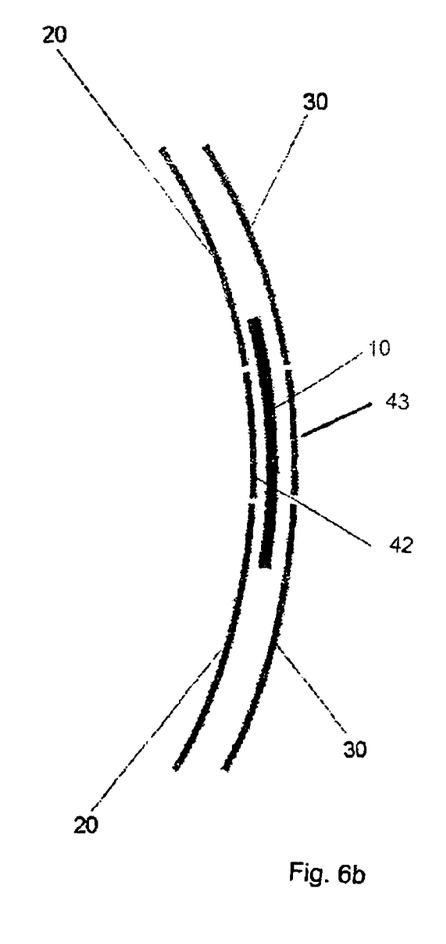

It can be seen in FIGS. 6a and 6b how, in accordance with method step VI (FIG. 1), window panes 42, 43 are arranged on both sides of that region of the grid-shaped connecting structure 10 which is not covered by the inner shells 20 and outer shells 30. The window panes 42, 43 end flush with the inner shells 20 and the outer shells 30, thus producing a window band 41 which fits homogeneously into the outer shape of the aircraft fuselage.

Figure 7:
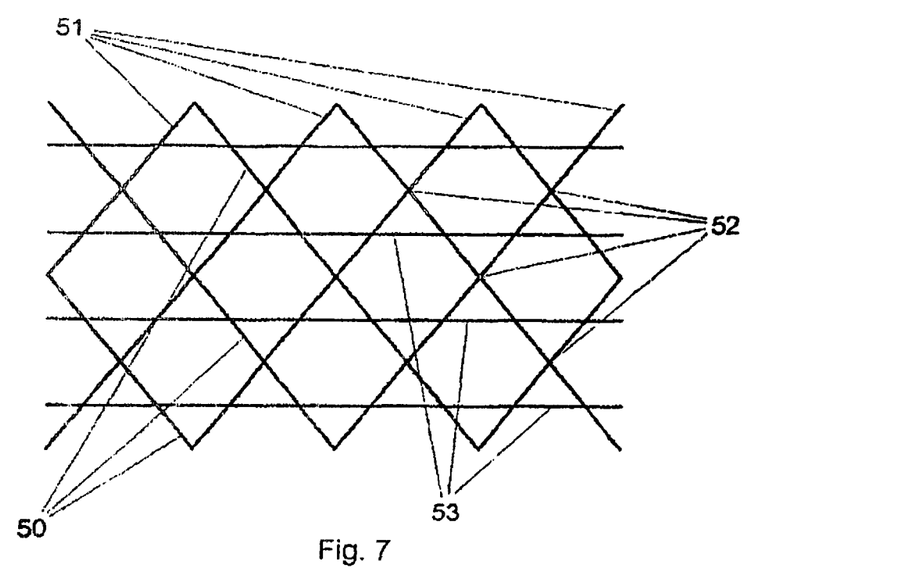
FIG. 7 shows a schematic illustration of a grid structure in the form of a lattice grid according to a preferred exemplary embodiment of the present invention.
Figure 8:
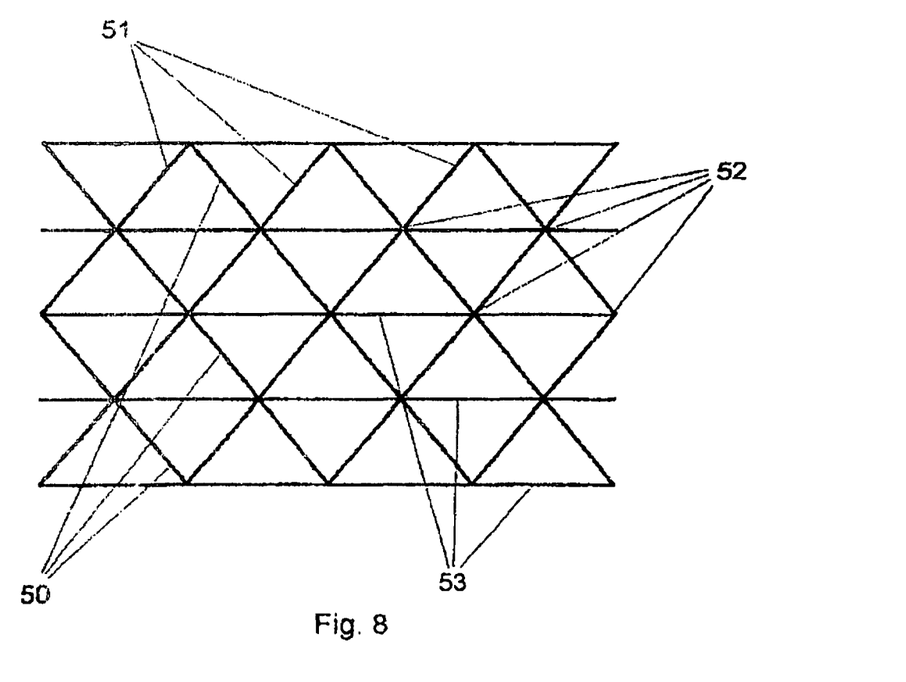
FIG. 8 shows a schematic illustration of a grid structure comprising an ISO grid structure.

In order to clarify the difference between a lattice grid, which is preferably used within the scope of the method according to the invention, and an ISO grid structure, FIGS. 7 and 8 respectively illustrate a cylindrical structure composed of a lattice grid and an ISO grid structure.

A cylindrical structure constructed in a grid-shaped manner and corresponding to an aircraft fuselage can be produced both from a lattice grid (FIG. 7) and from an ISO grid structure. Both grids have grid ribs which run in a spiral manner, the "spiral struts" 50, 51 or else "helical ribs". A first spiral strut 50 is arranged in an encircling manner from left to right and a second spiral strut 51 is arranged in an encircling manner from right to left. The two spiral struts intercept at a multiplicity of junctions 52. Further, both the lattice grid in FIG. 7 and the ISO grid structure in FIG. 8 have grid ribs which are referred to as circumferential ribs 53 or else as "hoop ribs" and run parallel to the longitudinal axis of the cylindrical structure.

Grids of this type exhibit an extremely high specific strength under high axial loading. This is caused especially by a self-stabilizing action. If the spiral net formed by the spiral struts 50, 51 is expanded under a compressive loading, a tensile loading occurs in the circumferential ribs. Furthermore, the stability of the spiral struts against buckling is very high because of the supporting effect within the grid.

A cylindrical structure composed of a lattice grid (FIG. 7) behaves in precisely the same manner as a hollow cylinder composed of a homogeneous material. The structure of an aircraft fuselage is therefore not weakened by the use of a lattice grid in the region of the window band.

An ISO grid structure (FIG. 8) is present when the circumferential ribs 53 run through the junctions 52 formed by the spiral ribs 50, 51. An ISO grid structure behaves like a shell with isotropic properties.

The optimum specific properties are achieved when the circumferential ribs 53 are arranged in such a manner that the buckling lengths of the spiral ribs 50, 51 are further reduced. This is possible in a lattice grid. A cylindrical structure constructed from a lattice grid exhibits global warping modes in a manner similar to an anisotropic cylindrical shell under bending or compressive loading.

Although the present invention has been described above with reference to preferred exemplary embodiments, it is not restricted thereto but rather can be modified in diverse ways.

For example, the grid-shaped connecting structure can first of all be fitted to the outer shell arrangement and core material can subsequently be provided on the outer shell arrangement, with the inner shell arrangement finally being provided.

Furthermore, the grid-shaped connecting structure, in addition to being provided in the region of the window band, can also be provided over the entire extent of the fuselage structure between the inner shell arrangement and outer shell arrangement. The fuselage structure can also be designed with the above-described window regions and grid structures merely in a plurality of regions spaced apart from one another.

Furthermore, the present inventive concept can be used both on single- and on multi-shell fuselage structures, with the grid structure and the pane device being correspondingly modified. The only thing that matters is that the grid structure ensures deflection of the force flux around the window regions.

What is claimed is:

1. A fuselage structure of an aircraft or spacecraft comprising:
    an inner shell arrangement which has an upper inner shell and a lower inner shell, the upper inner shell being spaced apart at least in some sections from the lower inner shell by a first gap in order to form a window region;
    a window band which is arranged at least in the window region and has a pane device which comprises a grid structure which absorbs fuselage forces;
    wherein the fuselage structure comprises an outer shell arrangement which has an upper outer shell associated with the upper inner shell and a lower outer shell associated with the lower inner shell, the upper outer shell being spaced apart at least in some sections in the window region from the lower outer shell by a second gap;
    wherein the outer shells are spaced from the inner shells for accommodating a core material between the inner and outer shell arrangements; and
    wherein the grid structure extends beyond the window region, which is formed by the first and second gaps, into the shell arrangements and is fastened to the individual shells of the inner and outer shell arrangements in order to form a fuselage structure which connects the individual shells to one another and is optimized in terms of force flux.

2. The fuselage structure according to claim 1, wherein the grid structure has individual grid ribs for forming grid meshes, the grid structure being designed to absorb the forces occurring in the fuselage.

3. The fuselage structure according to claim 1, wherein the grid structure is designed as a lattice grid structure and, in terms of shape configuration, is matched to the shape of the shell arrangements.

4. The fuselage structure according to claim 1, wherein the first gap and the second gap are formed at the same height and, at least in some sections, such that they run in the longitudinal direction of the fuselage structure, in order to form an optimized window region.

5. The fuselage structure according to claim 1, wherein the first gap and the second gap have the same gap widths and/or gap lengths.

6. The fuselage structure according to claim 1, wherein the pane device has at least two individual panes which each end flush with the associated inner and/or outer shells, can be fastened to the inner and/or outer shells and enclose the grid structure between them.

7. The fuselage structure according to claim 1, wherein a suitable core material is provided between the inner shells and the outer shells, at least with the exception of at least the window region.

8. An aircraft or spacecraft with a fuselage structure which is designed according to claim 1.

* * * * *